United States Patent
Hsu

(10) Patent No.: US 7,916,476 B2
(45) Date of Patent: Mar. 29, 2011

(54) SECURING APPARATUS FOR EXPANSION CARDS

(75) Inventor: Fu-Lun Hsu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/650,555

(22) Filed: Dec. 31, 2009

(65) Prior Publication Data
US 2011/0051364 A1    Mar. 3, 2011

(30) Foreign Application Priority Data
Sep. 1, 2009   (TW) .............................. 98129470 A

(51) Int. Cl.
H05K 5/00 (2006.01)
H05K 7/00 (2006.01)
H05K 7/18 (2006.01)
H05K 7/14 (2006.01)
A47G 19/08 (2006.01)

(52) U.S. Cl. .............. 361/679.57; 361/801; 361/679.58; 211/41.17

(58) Field of Classification Search ............. 361/679.31, 361/679.32, 679.58, 801; 211/41.17; 312/223.1, 312/223.2
See application file for complete search history.

(56) References Cited

U.S. PATENT DOCUMENTS 5,673,175 A * 9/1997 Carney et al. ............ 361/679.58
6,138,839 A * 10/2000 Cranston et al. ........... 211/41.17
* cited by examiner Primary Examiner — Lisa Lea-Edmonds
Assistant Examiner — Anthony M Haughton
(74) Attorney, Agent, or Firm — Zhigang Ma

(57) ABSTRACT

A securing apparatus is provided for securing an expansion card with a shielding plate to an enclosure of an electronic device. The securing apparatus includes a panel, a limiting member, a locking member, and the latch member. The limiting member is pivotably mounted to the panel to abut the shielding plate in cooperation with the panel. A first locking portion is formed on the limiting member. The locking member is pivotably attached to the limiting member and overlaps on the limiting member. A second locking portion is formed on the locking member to engage with the first locking portion. The latch member is pivotably mounted to the locking member. A hook is formed on the panel to catch the latch member, thereby securing the expansion card to the enclosure.

10 Claims, 4 Drawing Sheets

SECURING APPARATUS FOR EXPANSION CARDS

BACKGROUND

1. Technical Field

The disclosure relates to a securing apparatus for expansion cards.

2. Description of Related Art

Expansion cards are attached to a motherboard inside a computer enclosure of a personal computer (PC), to provide for connection of external devices such as external modems with the PC. Generally, each expansion card comprises a printed circuit board (PCB) and a slot cover. A bent end portion of the slot cover defines a cutout. A support plate is extended outwardly from a rear panel of the computer enclosure. A hole is defined in the support plate. The expansion card is fixed to the rear panel by a screw extending through the cutout and engaging in the hole. However, attaching by a screw is unduly complicated and time-consuming, particularly when several expansion cards are to be fixed to the rear panel. In addition, a tool is usually required for installation and removal of the screw.

DETAILED DESCRIPTION

Figure 1:
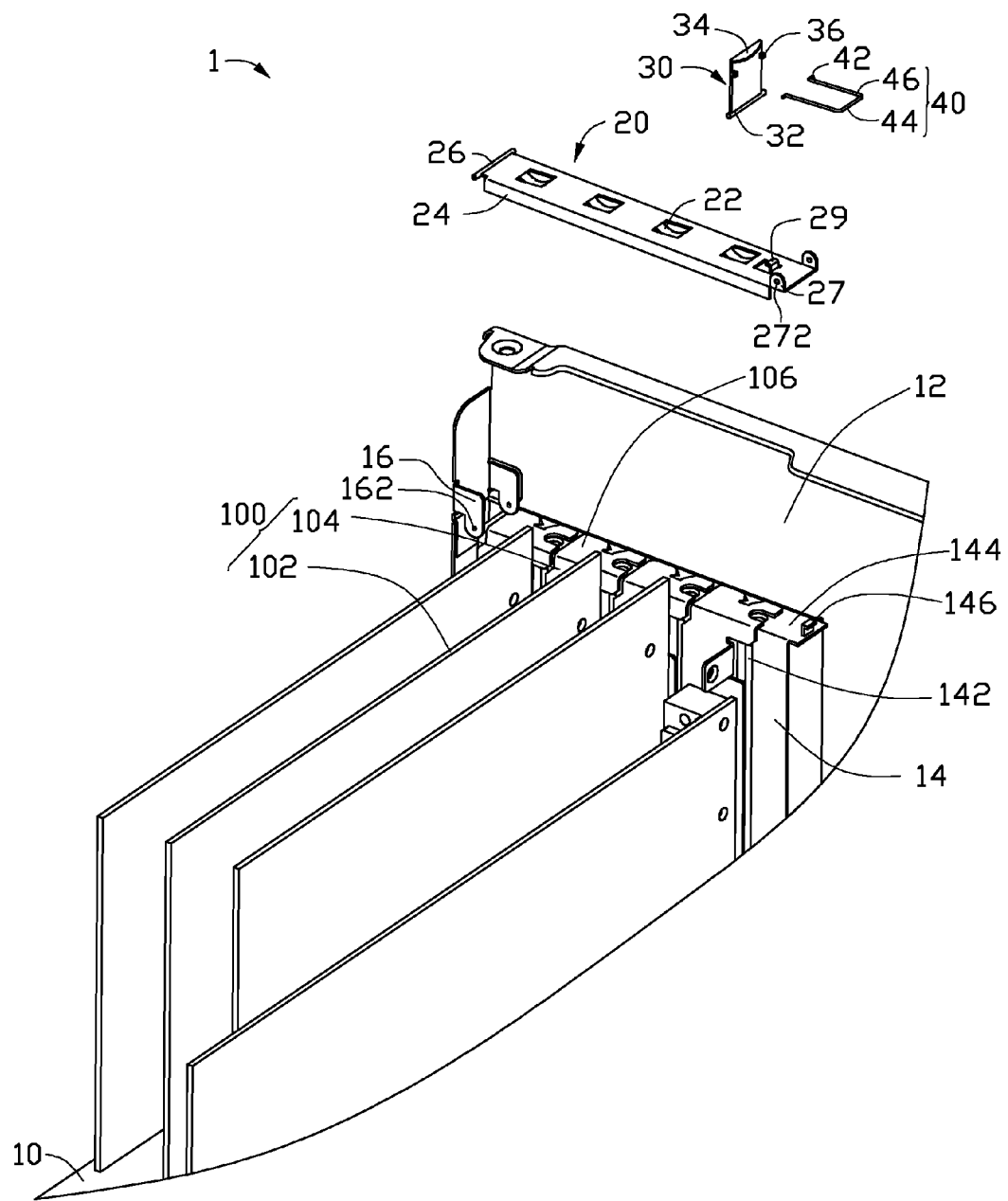
FIG. 1 is an exploded, isometric view of an exemplary embodiment of a securing apparatus for expansion cards, together with several expansion cards.

Referring to FIG. 1, an exemplary embodiment of a securing apparatus 1 is provided for fixing expansion cards 100 to an enclosure of an electronic device, such as a computer enclosure. Each expansion card 100 includes a circuit board 102 perpendicularly mounted to a motherboard 10 inside the computer enclosure, and an L-shaped shielding plate 104 fixed to an end of the circuit board 102. A bent portion 106 is bent from a top end of the shielding plate 104, and the bent portion 106 is perpendicular to the motherboard 10. The securing apparatus 1 includes a rear panel 12 bounding the computer enclosure, an elongated limiting member 20, a locking member 30, and a latch member 40.

The rear panel 12 includes a support frame 14 extending inwardly from the rear panel 12, thereby forming a stepped portion 144 connected between the rear panel 12 and the support frame 14. A plurality of elongated slots 142 is defined in the support frame 14, corresponding to the shielding plates 104 of the expansion cards 100. A pair of spaced brackets 16 protrudes from the rear panel 12, adjacent to a first end of the stepped portion 144. A pivot hole 162 is defined in each bracket 16. A hook 146 is formed on a second end of the stepped portion 144, opposite to the first end of the stepped portion 144.

A first shaft 26 is formed on a first end of the limiting member 20, and a pair of spaced projections 27 is formed on a second end of the limiting member 20, opposite to the first end of the limiting member 20. A pivot hole 272 is defined in each projection 27. A plurality of aligned resilient tabs 22 protrudes from the limiting member 20, along an elongated direction of the limiting member 20. A first locking portion 29 is formed on the limiting member 20, adjacent to the pair of projections 27. A flange 24 is perpendicularly bent from an elongated side of the limiting member 20, opposite to the rear panel 12.

The locking member 30 includes a second shaft 32 formed on a first end of the locking member 30, and a handle 34 bent from a second end of the locking member 30, opposite to the first end of the locking member 30. A pair of spaced ear portions 36 each defining a pivot hole (not labeled) perpendicularly protrudes from opposite sides of the locking member 30. A second locking portion 38 (see FIG. 4) protrudes from the locking member 30, opposite to the pair of ear portions 36, and corresponding to the first locking portion 29 of the limiting member 20.

The latch member 40 is generally U-shaped and includes a coupling portion 44, two legs 46 perpendicularly bent in the same direction from opposite ends of the coupling portion 44, and two pins 42 perpendicularly extending from distal ends of the legs 46.

Figure 2:
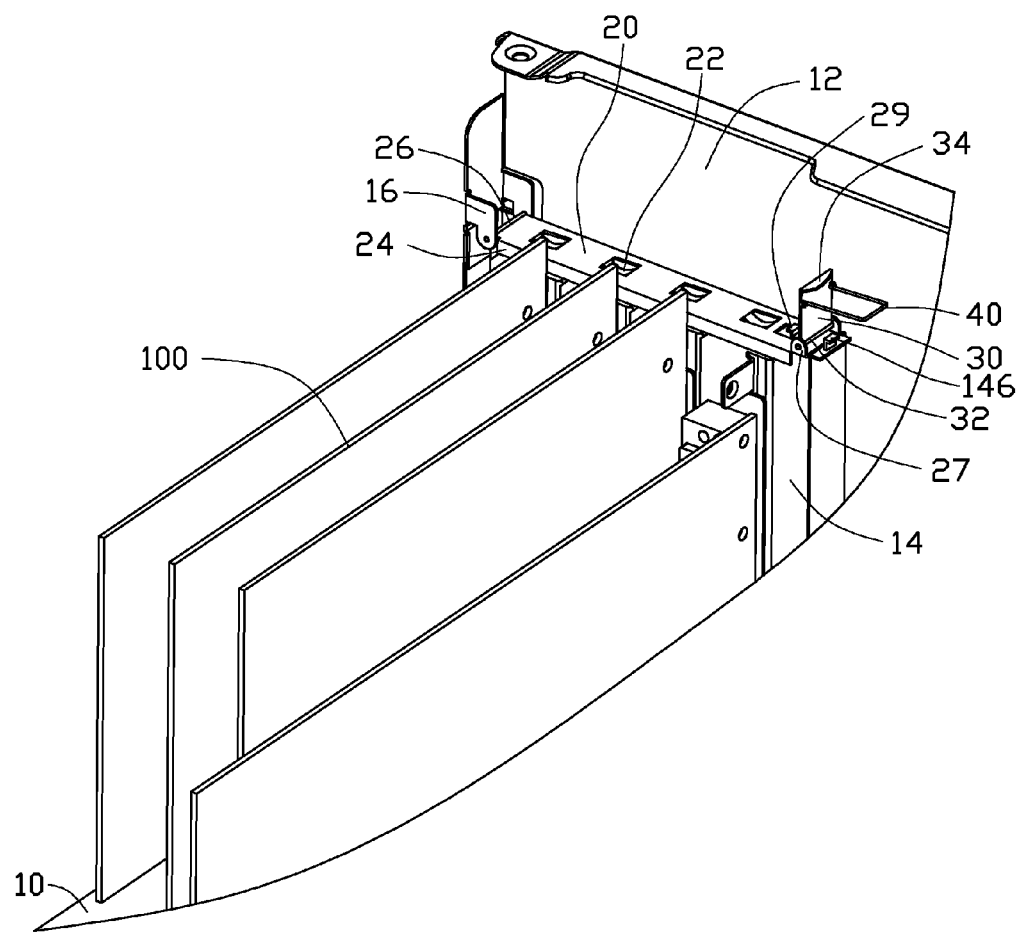
FIG. 2 is an assembled, isometric view of the securing apparatus and the expansion cards of FIG. 1, showing the securing apparatus in an unlocked state.
Figure 3:
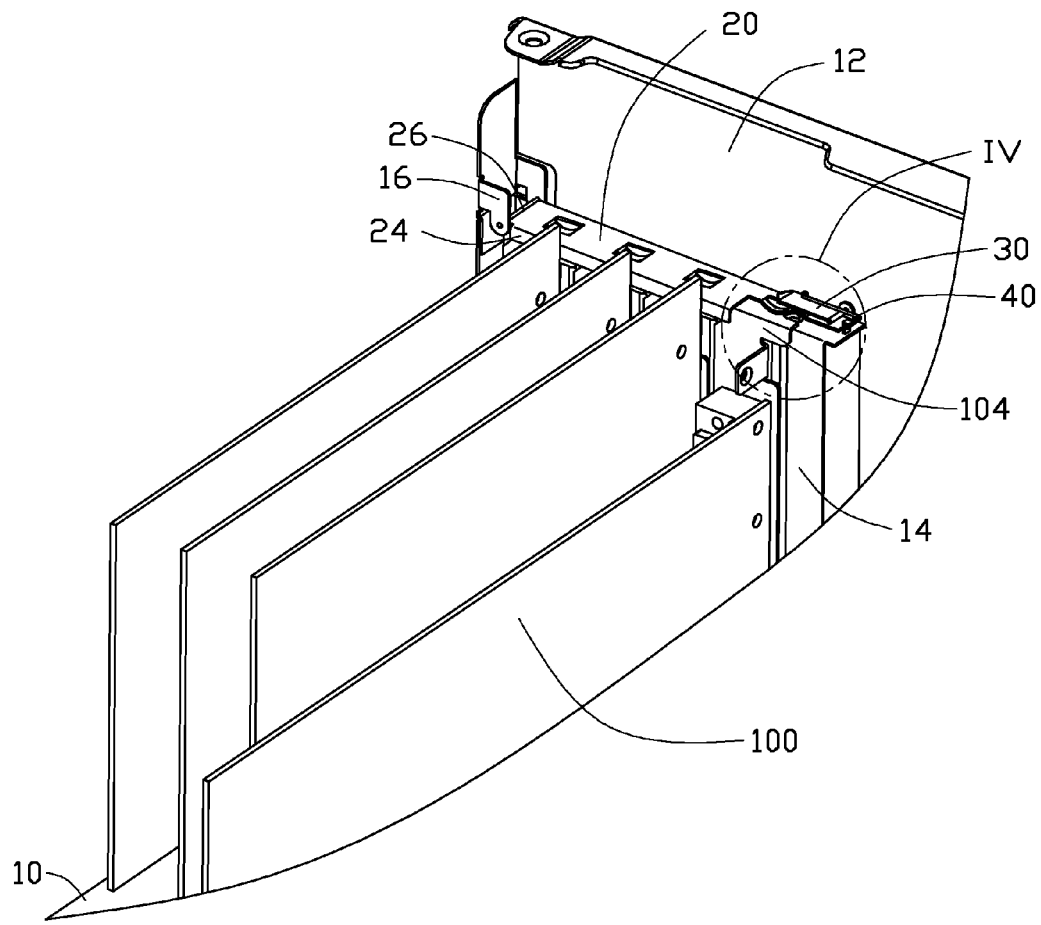
FIG. 3 is similar to FIG. 2, but showing the securing apparatus in a locked state, wherein the securing apparatus is partially cut away.
Figure 4:
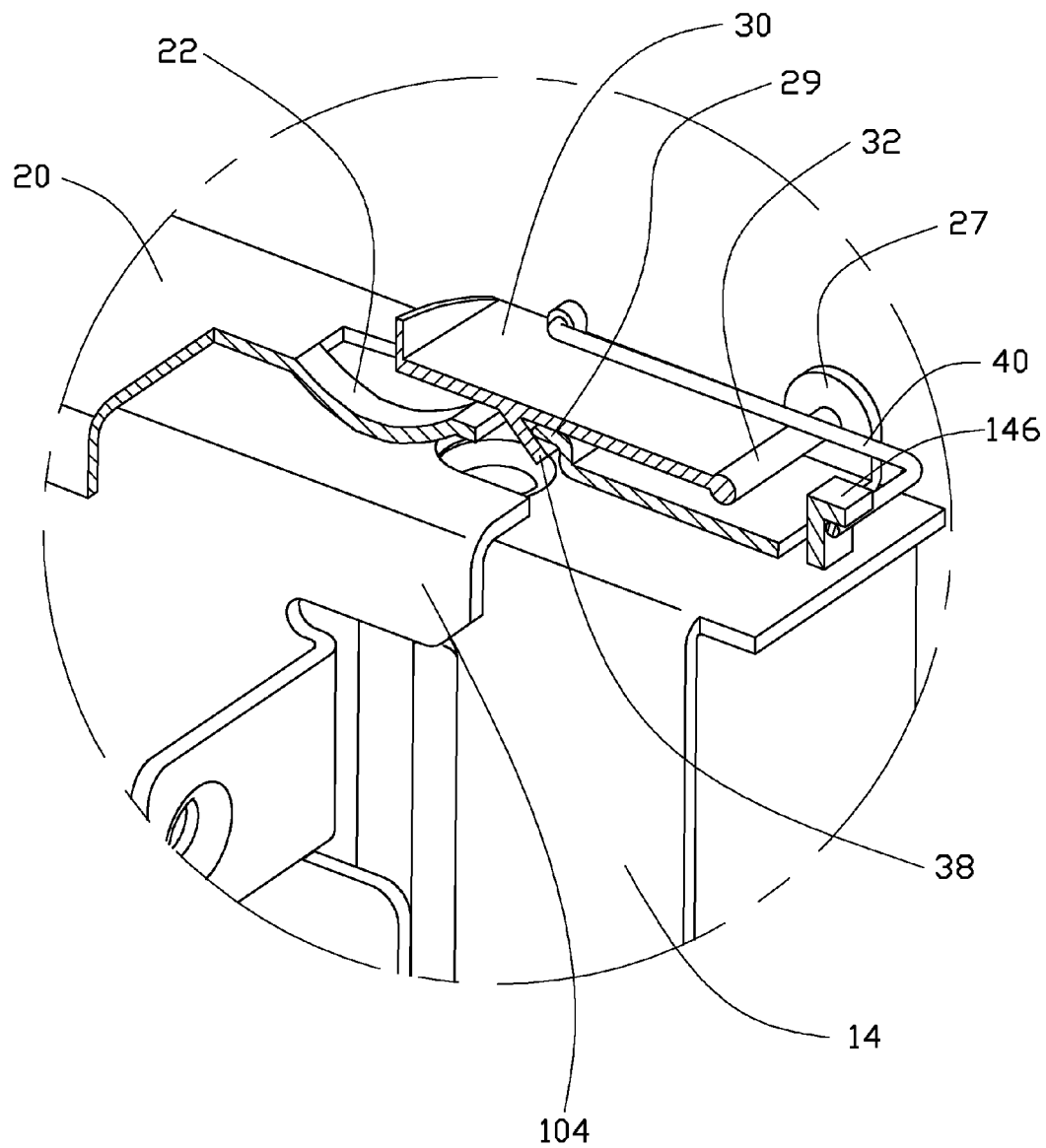
FIG. 4 is an enlarged cutaway view of an encircled portion IV of FIG. 3.

Referring to FIGS. 2 to 4, in assembly, opposite ends of the first shaft 26 of the limiting member 20 are pivotably engaged in the pivot holes 162 of the pair of brackets 16 correspondingly, pivotably mounting the limiting member 20 to the rear panel 12. Opposite ends of the second shaft 32 of the locking member 30 are pivotably engaged in the pivot holes 272 of the pair of projections 27 correspondingly. The two legs 46 of the latch member 40 are resiliently deformed towards each other, thereby allowing the pins 42 of the two legs 46 to be pivotably engaged in the pivot holes of the pair of ear portions 36 of the locking member 30 correspondingly.

In assembling the expansion cards 100, the circuit boards 102 of the expansion cards 100 are perpendicularly placed on the motherboard 10, while the shielding plates 104 of the expansion cards 100 respectively cover the slots 142 of the support frame 14 correspondingly and the bent portions 106 of the shielding plates 104 abut the stepped portion 144 of the support frame 14. The limiting member 20 is rotated to allow the plurality of tabs 22 of the limiting member 20 to resiliently abut the bent portions 106 in cooperation with the stepped portion 144. The flange 24 of the limiting member 20 in cooperation with the support frame 14, sandwiches the shielding plates 104. The hook 146 of the stepped portion 144 catches the coupling portion 44 of the latch member 40. The locking member 30 is rotated away from the hook 146 to overlap on the limiting member 20. The locking member 30 is driven to allow the second locking portion 38 of the locking member 30 to engage with the first locking portion 29 of the limiting member 20. Therefore, the expansion cards 100 are firmly and conveniently secured to the computer enclosure.

To remove the expansion cards 100, the locking portions 29, 38 are released from each other by operating the handle 34 of the locking member 30, and the latch member 40 is released from the hook 146. The locking member 30 is rotated towards the hook 146 by operating the handle 34, thereby the limiting member 20 is rotated to move away from the bent portions 106 of the expansion cards 100. Therefore, the expansion cards 100 are ready to be removed from the computer enclosure.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A securing apparatus for securing at least one expansion card with a shielding plate to an enclosure of an electronic device, the securing apparatus comprising:
   a panel;
   a limiting member pivotably mounted to the panel to abut the shielding plate in cooperation with the panel, a first locking portion being formed on the limiting member;
   a locking member pivotably attached to the limiting member to overlap on the limiting member, a second locking portion being formed on the locking member to engage with the first locking portion; and
   a latch member pivotably mounted to the locking member, wherein a hook is formed on the panel to catch the latch member, thereby securing said at least one expansion card to the enclosure.

2. The securing apparatus of claim 1, wherein a pair of spaced brackets each defining a first pivot hole protrudes from the panel, a first shaft is formed on the limiting member, and two ends of the first shaft are pivotably engaged in the first pivot holes of the pair of brackets correspondingly, pivotably mounting the limiting member to the panel.

3. The securing apparatus of claim 2, wherein a pair of spaced projections each defining a second pivot hole is formed on the limiting member, away from the first shaft; a second shaft is formed on the locking member, and two ends of the second shaft are pivotably engaged in the second pivot holes of the pair of projections correspondingly, to pivotably attach the locking member to the limiting member.

4. The securing apparatus of claim 3, wherein a pair of spaced ear portions protrudes from the locking member, the latch member comprises two pins pivotably engaged with the pair of ear portions correspondingly, thereby pivotably mounting the latch member to the locking member.

5. The securing apparatus of claim 4, wherein a handle is bent from the locking member, away from the second shaft of the locking member.

6. The securing apparatus of claim 4, wherein the latch member is generally U-shaped and further comprises a coupling portion engagable with the hook of the panel, and two legs bent in the same direction from opposite ends of the coupling portion, the two pins are formed on distal ends of the two legs.

7. The securing apparatus of claim 2, wherein a support frame protrudes from the panel for abutting the shielding plate of said at least one expansion card, a stepped portion is formed between the panel and the support frame, to sandwich a top end of the shielding plate in cooperation with the limiting member.

8. The securing apparatus of claim 7, wherein at least one resilient tab protrudes from the limiting member, to resiliently abut the top end of the shielding plate in cooperation with the stepped portion of the panel.

9. The securing apparatus of claim 7, wherein the pair of brackets of the panel is adjacent to a first end of the stepped portion, and the hook of the panel is formed on an opposite second end of the stepped portion.

10. The securing apparatus of claim 7, wherein a flange is bent from the limiting member to sandwich the shielding plate in cooperation with the support frame.

* * * * *